(12) United States Patent
Morimoto

(10) Patent No.: US 12,147,599 B2
(45) Date of Patent: Nov. 19, 2024

(54) ULTRASONIC USER INTERFACE DEVICE

(71) Applicant: SONY GROUP CORPORATION, Tokyo (JP)

(72) Inventor: Rui Morimoto, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 696 days.

(21) Appl. No.: 17/309,447

(22) PCT Filed: Nov. 29, 2019

(86) PCT No.: PCT/JP2019/046700
§ 371 (c)(1),
(2) Date: May 27, 2021

(87) PCT Pub. No.: WO2020/121836
PCT Pub. Date: Jun. 18, 2020

(65) Prior Publication Data
US 2022/0019283 A1    Jan. 20, 2022

(30) Foreign Application Priority Data
Dec. 11, 2018 (JP) .................................. 2018-231385

(51) Int. Cl.
*G06F 3/01* (2006.01)
*G01S 15/89* (2006.01)

(52) U.S. Cl.
CPC .......... *G06F 3/014* (2013.01); *G01S 15/8922* (2013.01); *G06F 3/015* (2013.01); *G06F 3/017* (2013.01)

(58) Field of Classification Search
CPC .......... G06F 3/014; G06F 3/015; G06F 3/017; G06F 3/011; G01S 15/8922
See application file for complete search history.

(56) References Cited

U.S. PATENT DOCUMENTS 10,678,335 B2 * 6/2020 Keller .............. G06K 19/07762
11,467,670 B2 * 10/2022 Keller ..................... G06F 3/017
(Continued)

FOREIGN PATENT DOCUMENTS

CN        108431736 A    8/2018
EP        3368966 A1     9/2018
(Continued)

OTHER PUBLICATIONS

International Search Report and Written Opinion of PCT Application No. PCT/JP2019/046700, issued on Feb. 18, 2020, 11 pages of ISRWO.

(Continued)

*Primary Examiner* — William Lu
(74) *Attorney, Agent, or Firm* — CHIP LAW GROUP

(57) ABSTRACT

[Object] To provide an ultrasonic user interface device capable of accurately obtaining movement information of a body part. [Solving Means] An ultrasonic user interface device includes a transmission unit and a reception unit. The transmission unit transmits an ultrasonic wave toward an internal tissue of an arm part or a leg part of a user. The plurality of reception units is arranged so as to surround the arm part or the leg part in a circumferential direction of the arm part or the leg part to which the ultrasonic wave is transmitted and that receives, for obtaining movement information of at least a part of the limbs of the user, at least one of an ultrasonic wave obtained when the ultrasonic wave is transmitted through the internal tissue or an ultrasonic wave obtained when the ultrasonic wave is reflected on the internal tissue.

11 Claims, 8 Drawing Sheets

(56) References Cited

U.S. PATENT DOCUMENTS

| | | | |
|---|---|---|---|
| 2013/0041477 A1 | 2/2013 | Sikdar et al. | |
| 2016/0242736 A1* | 8/2016 | Freiburg | A61B 8/14 |
| 2017/0055938 A1* | 3/2017 | Krasnow | A61B 8/467 |
| 2017/0123487 A1* | 5/2017 | Hazra | G06F 3/0482 |
| 2017/0157431 A1* | 6/2017 | Cheatham, III | A61N 1/36021 |
| 2017/0323130 A1* | 11/2017 | Dickinson | G06V 40/1306 |
| 2017/0330553 A1* | 11/2017 | Garlepp | G10K 11/34 |
| 2018/0078155 A1* | 3/2018 | Baek | G16H 50/30 |
| 2018/0129849 A1* | 5/2018 | Strohmann | G06V 40/1394 |
| 2019/0212821 A1* | 7/2019 | Keller | G06F 3/0426 |
| 2019/0290198 A1* | 9/2019 | Belson | A61B 5/002 |
| 2020/0245950 A1* | 8/2020 | Liang | A61B 5/01 |
| 2023/0012053 A1* | 1/2023 | Taki | G06F 3/167 |

FOREIGN PATENT DOCUMENTS

| | | |
|---|---|---|
| JP | 2006-212287 A | 8/2006 |
| JP | 2011-048818 A | 3/2011 |
| JP | 2018-536933 A | 12/2018 |
| JP | 2021-184297 A | 12/2021 |
| KR | 10-2018-0088390 A | 8/2018 |
| TW | 201727439 A | 8/2017 |
| WO | 2016/038953 A1 | 3/2016 |
| WO | WO-2017075611 A1 * | 5/2017 ............ G06F 1/163 |
| WO | 2017/163389 A1 | 9/2017 |
| WO | 2017/221381 A1 | 12/2017 |

OTHER PUBLICATIONS

Mcintosh, et al., "EchoFlex: Hand Gesture Recognition using Ultrasound Imaging", Proceedings of the 2017 CHI Conference on Human Factors in Computing Systems, May 6-11, 2017, pp. 1923-1934.

Extended European Search Report of EP Application No. 19896393.6, issued on Dec. 20, 2021, 19 pages.

* cited by examiner

ULTRASONIC USER INTERFACE DEVICE

CROSS REFERENCE TO RELATED APPLICATIONS

This application is a U.S. National Phase of International Patent Application No. PCT/JP2019/046700 filed on Nov. 29, 2019, which claims priority benefit of Japanese Patent Application No. JP 2018-231385 filed in the Japan Patent Office on Dec. 11, 2018. Each of the above-referenced applications is hereby incorporated herein by reference in its entirety.

TECHNICAL FIELD

The present technology relates to an ultrasonic user interface device that obtains movement information of a user with ultrasonic waves.

BACKGROUND ART

As a technology for detecting the shape and movement of a user's hand finger, Patent Literature 1 has disclosed a hand-wearable controller including a sensor array capable of detecting the shape of the hand finger by reflection of light, for example.

CITATION LIST

Patent Literature

Patent Literature 1: WO 2016/038953

DISCLOSURE OF INVENTION

Technical Problem

In a system for detecting the movement of a hand as described above, it is desirable to accurately detect the movement of the hand.

In view of the above-mentioned circumstances, it is an object of the present technology to provide an ultrasonic user interface device capable of accurately obtaining movement information of a body part.

Solution to Problem

In order to accomplish the above-mentioned object, an ultrasonic user interface device according to an embodiment of the present technology includes a transmission unit and a reception unit.

The transmission unit transmits an ultrasonic wave toward an internal tissue of an arm part or a leg part of a user.

The plurality of reception units is arranged so as to surround the arm part or the leg part in a circumferential direction of the arm part or the leg part to which the ultrasonic wave is transmitted and that receives, for obtaining movement information of at least a part of the limbs of the user, at least one of an ultrasonic wave obtained when the ultrasonic wave is transmitted through the internal tissue or an ultrasonic wave obtained when the ultrasonic wave is reflected on the internal tissue.

With this configuration, the plurality of reception units arranged in the circumferential direction of the arm part or the leg part can receive the ultrasonic wave obtained when the ultrasonic wave transmitted from the transmission unit is transmitted through the internal tissue of the arm part or the leg part or the ultrasonic wave obtained when the ultrasonic wave is reflected on the internal tissue. Accordingly, it is possible to obtain detailed internal tissue information of the arm part or the leg part and to correctly obtain the movement information of the limbs.

The transmission unit may include a plurality of transmission units that is arranged in the circumferential direction of the arm part or the leg part.

The reception unit may include at least five reception units.

The plurality of reception units may receive at least one of ultrasonic waves sequentially transmitted by each of the plurality of transmission units and reflected on or transmitted through the internal tissue.

The ultrasonic user interface device may further include a control unit that obtains movement information of at least a part of the limbs by using reception results for recognition received by the plurality of reception units.

The control unit may obtain movement information of at least a part of the limbs by using a reception result for recognition received by each of the plurality of reception units obtained every time each of the plurality of transmission units transmits the ultrasonic wave.

The control unit may refer to data for reference in which information according to the reception result for comparison received by the reception unit and the movement information of the limbs are associated with each other, which is obtained in advance, and obtain movement information of at least a part of the limbs from the reception result for recognition.

The control unit may correct the positional deviation of the transmission unit and the reception unit with respect to the arm part or the leg part by using a reception result for recognition related to an ultrasonic wave reflected on a bone present in the inside, which is received by the reception unit, and obtain movement information of at least a part of the limbs.

The control unit may refer to the data for reference in which waveform data of an ultrasonic wave for comparison received by the reception unit, which is obtained in advance, and the movement information of the limbs are associated with each other, and obtain movement information of at least a part of the limbs from waveform data of an ultrasonic wave for recognition, which is received by the reception unit.

The control unit may refer to the data for reference in which an ultrasonic image based on the reception result for comparison and the movement information of the limbs are associated with each other, which is obtained in advance, and obtain movement information of at least a part of the limbs from an ultrasonic image based on the reception result for recognition.

The ultrasonic user interface device may further include an acoustic matching component including an ultrasonic vibrator including at least one of the transmission unit or the reception unit, a deformable member that is disposed between the arm part or the leg part and has an acoustic impedance of 0.8 MRayls or more and 3 MRayls or less, and a container that houses the deformable member and has an acoustic impedance of 0.8 MRayls or more and 3 MRayls or less.

MODE(S) FOR CARRYING OUT THE INVENTION

Overview of Ultrasonic User Interface Device

Figure 1:
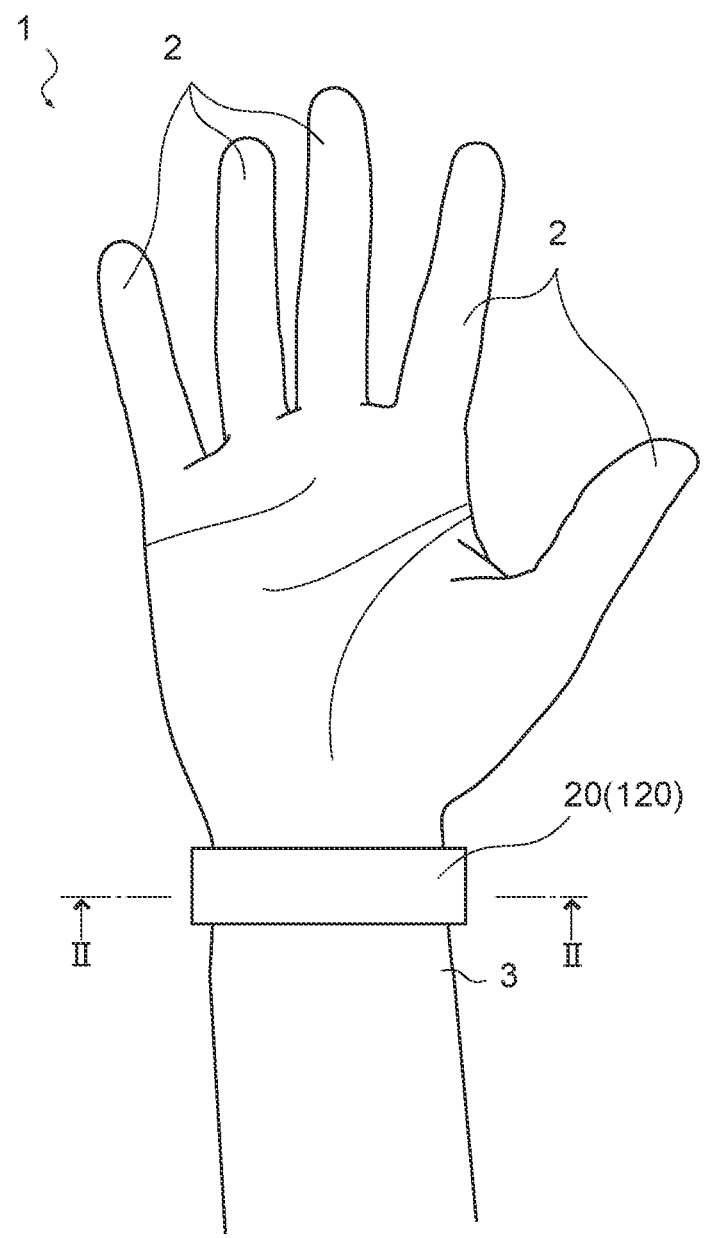
FIG. 1 A diagram showing a part of a hand and a forearm part of a user wearing an ultrasonic user interface device according to an embodiment of the present technology.

An ultrasonic user interface device according to the present technology will be described. The ultrasonic user interface device is configured to be wearable on a user's arm part or leg part. The arm part refers to a portion from the shoulder to the wrist and the leg part refers to a portion from the base of the leg to the ankle.

The ultrasonic user interface device includes an ultrasonic vibrator. The ultrasonic vibrator obtains sensing data of an internal tissue of a body part to which the ultrasonic user interface device is attached. Based on the obtained sensing data, the movement of the muscles and tendons of the arms and legs is analyzed, the movement of the body part, more specifically, the movement of at least a part of the limb of the user is recognized, and the movement information of at least a part of limbs is obtained.

The limbs refer to the right and left upper limbs and lower limbs of the human body. The upper limb refers to a portion from a shoulder joint to fingertips of a hand. The lower limb refers to a portion from a hip joint to a toe of a foot. The part of the limbs is one or a combination of two or more selected from fingers of hands, wrists (wrist joints), forearm parts, upper arm parts, elbow joints, shoulder joints, fingers of feet, ankles (ankle joints), lower legs, thighs, knee joints, hip joints, and the like that constitute the limbs.

For example, by analyzing the movement of muscles and tendons inside the upper arm part by using sensing data of the internal tissue of the upper arm part, which is obtained by attaching the ultrasonic user interface device to the upper arm part, the movement of the upper limb such as extension of the elbow joint and flexion and supination of the forearm is recognized.

Moreover, by analyzing the movement of muscles and tendons inside the lower leg by using sensing data of the internal tissue of the lower leg, which is obtained by the ultrasonic user interface device attached to the lower leg, the movement of the lower leg such as plantar flexion, dorsiflexion, valgus, and varus of the ankle joint, flexion of the knee joint, extension and flexion of the fingers of the foot is recognized.

Moreover, by analyzing the movement of the muscles and tendons of the thigh by using sensing data of the internal tissue of the thigh, which is obtained by the ultrasonic user interface device attached to the thigh, the movement of the lower limb such as flexion and extension of the knee joint, flexion and extension of the hip joint, adduction, and abduction, is recognized. Moreover, by analyzing the operation of the muscles and tendons inside the thigh together with the movement of the muscles and tendons inside the lower leg, the movement of walking, running, jumping, and the like is also recognized.

Moreover, by analyzing the movement of muscles and tendons inside the wrist by using sensing data of the internal tissue of the wrist, which is obtained by the ultrasonic user interface device attached to the forearm part, for example, the wrist, the movement of the upper limb such as extension, flexion, adduction, abduction, flexion, extension, radial deviation, and ulnar deviation of the wrist (wrist joint) is recognized.

It is possible to cause, for example, an avatar simulating a human to be displayed in a game image such as a virtual reality (VR) image to reproduce the movement of a user 1 by using the recognized and obtained movement information of the limb or the like.

Hereinafter, an example in which the ultrasonic user interface device is worn on the forearm part of the user, more specifically, on the wrist will be described, though it may be configured to be wearable on the upper arm part or the leg part. Alternatively, the ultrasonic user interface device may be attached to both the leg parts and the arm parts to obtain movement information of both the upper limbs and the lower limbs.

Figure 2:
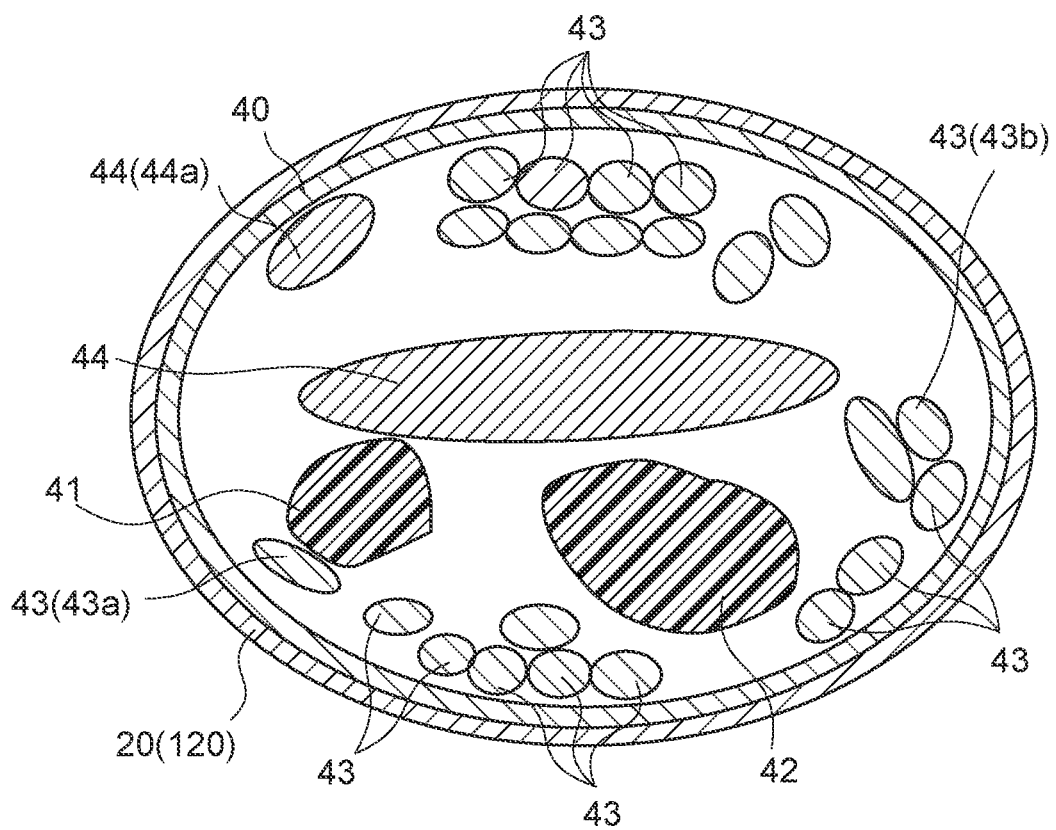
FIG. 2 A schematic cross-sectional view taken along the line II-Il in FIG. 1.

FIG. 1 is a diagram showing a part of a right hand and a right forearm part of a user wearing an ultrasonic user interface device according to an embodiment of the present technology on a wrist. FIG. 2 is a schematic cross-sectional view taken along the line II-II in FIG. 1. FIG. 2 corresponds to a cross-sectional view of a wrist in which the palm is located on the upper side, the back of the hand is located on the lower side, the little finger is located on the left side, and the thumb is located on the right side in the figure.

As shown in FIG. 1, an ultrasonic user interface device 20 (120) is configured to be wearable on, for example, a wrist of a forearm part 3 of the user 1.

As shown in FIG. 2, the ultrasonic user interface device 20 (120) has a shape that surrounds the entire circumference of the wrist. The ultrasonic user interface device (120) is, for example, a wristband type, a wristwatch type, or the like.

In the wristband type, for example, a stretchable band-like member is formed in a ring shape. The user 1 can attach the ultrasonic user interface device to the wrist by expanding the band-like member as an accessory to enlarge the ring, inserting the wrist into the ring, and releasing the expansion.

When it is worn, the ultrasonic user interface device is fixed to the wrist, and an ultrasonic vibrator to be described later provided on the ultrasonic user interface device is held in contact with skin 40 of the wrist. The use of the stretchable band-like member allows the band-like member to be deformed to conform the shape of the skin surface of the wrist. In the case of the wristband type, it is desirable that the ultrasonic vibrator be fixed to the band-like member so as not to be peeled off or deviated in position at each time of attachment and detachment to the wrist.

The wristwatch type has a configuration in which the band-like member as the accessory is provided with a fixture, and it is possible to wear it on the wrist of the user 1 with the fixture. The band-like member may be made from a flexible material that easily conforms to the shape of the skin surface of the wrist.

For example, a hook-and-loop fastener consisting of a hook surface raised as hooks and a loop surface raised as dense loops can be used as the fixture. In another example, a buckle tongue that can be inserted into a plurality of small holes provided in a band-like member, which is used in a typical wristwatch, can be used as the fixture.

In the embodiment using the hook-and-loop fastener, for example, the hook surface is provided at one end of the band-like member, the loop surface is provided at the other end, and the band-like member can be formed in a ring shape into which the wrist of the user 1 is to be inserted by bonding the hook surface and the loop surface together. The size of the ring can be adjusted by changing the position of bonding between the hook surface and the loop surface.

Moreover, in the form of using the buckle tongue, a plurality of small holes is provided at one end of the band-like member in a longitudinal direction of the band-like member, the buckle tongue is provided at the other end, and the band-like member can be formed in a ring shape into which the wrist of the user 1 is to be inserted by inserting the buckle tongue into one of the small holes. The size of the ring can be adjusted by changing the position of the small hole into which the buckle tongue is to be inserted.

In either form, the size of the ring can be adjusted in accordance with the size of the wrist of the user 1, and the ultrasonic user interface device 20 (120) can be fixed to the wrist such that the ultrasonic vibrator equipped with parts is held in contact with the skin 40 of the wrist when it is worn.

In each of the embodiments to be described later, a wristband-type ultrasonic user interface device will be described as an example.

As shown in FIG. 2, bones such as an elbow bone 41 and a radial bone 42, a plurality of tendons 43, a plurality of muscles 44, and the like are located as internal tissues inside the wrist surrounded by the skin 40 of the wrist to which the ultrasonic user interface device 20 (120) is attached.

The movement of each tendon 43 and each muscle 44 is closely related to the type, number, and angle of fingers to be extended, flexed, adducted, or abducted, the angle of the wrist (wrist joint) to be flexed, extended, undergo radial deviation, or undergo ulnar deviation, and the like, which are associated with various forms that the hand takes.

For example, a flexor carpi ulnaris 44a is mainly involved in the palmar flexion (flexion) movement of the wrist joint and is also involved in the ulnar deviation movement of the wrist joint together with an extensor carpi ulnaris muscle tendon 43a. The extensor carpi ulnaris muscle tendon 43a is involved in the extensor movement and ulnar deviation movement of the wrist joint and the extension movement of the elbow joint. Moreover, an abductor pollicis longus muscle 43b acts on the movement of the thumb away from the palm and is also involved in the radial deviation movement of the wrist joint. Moreover, an extensor carpi radialis longus tendon 43c and an extensor carpi radialis brevis tendon 43d are involved in the dorsiflexion (flexion) and radial deviation of the wrist joint and the flexion movement of the elbow joint.

As described above, the specific tendon 43 and the muscle 44 move by the extension, flexion, adduction, abduction, or flexion of the finger, the flexion, extension, radial deviation, or ulnar deviation of the wrist (the wrist joint), or the like. Therefore, the movement of the wrist joint (movement of the wrist) and the movement of the fingers of the hand can be recognized on the basis of the movements of the tendon 43 and the muscle 44.

Figure 3:
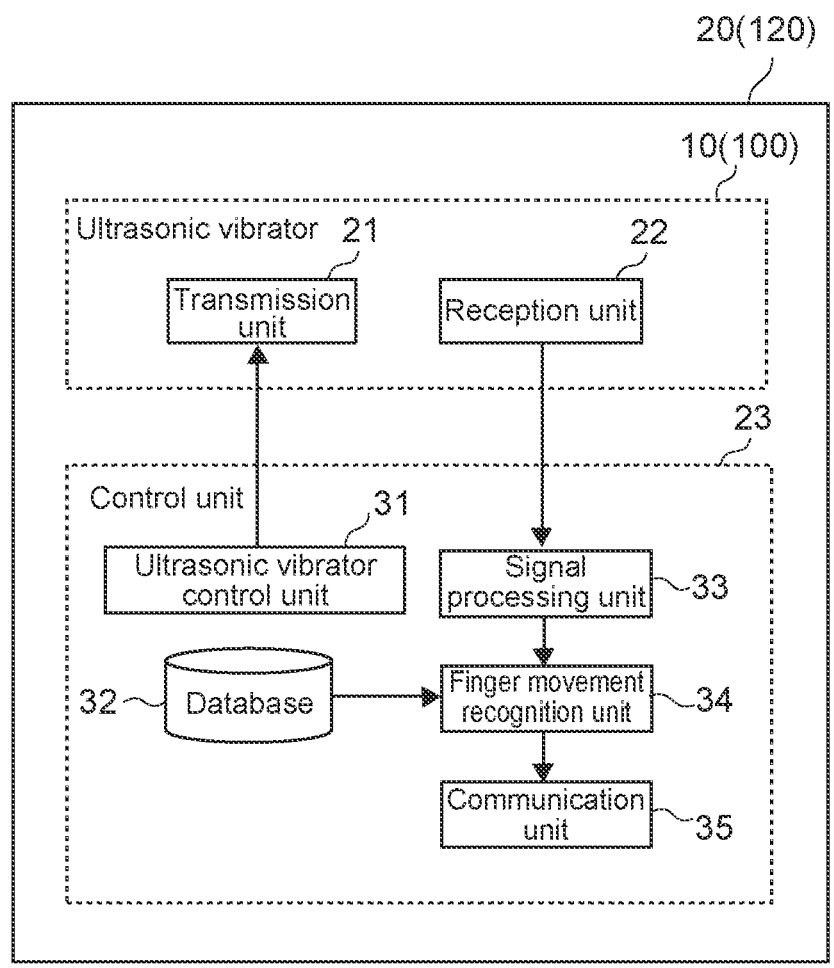
FIG. 3 A block diagram showing a schematic configuration of the ultrasonic user interface device.

FIG. 3 is a block diagram showing a schematic configuration of the ultrasonic user interface device 20 (120). As shown in FIG. 3, the ultrasonic user interface device 20 (120) includes an ultrasonic vibrator 10 (100) and a control unit 23.

The ultrasonic vibrator 10 (100) includes a transmission unit 21 and a reception unit 22. The control unit 23 controls the operation of the ultrasonic vibrator 10 (100). Moreover, the control unit 23 recognizes the movement of the wrist or hand fingers by using a reception result for recognition received by the ultrasonic vibrator 10 (100). The reception result is sensing data obtained by the ultrasonic vibrator 10 (100) which is a sensing device.

The transmission unit 21 transmits an ultrasonic wave toward the inside of the body part of the user 1 to which the ultrasonic user interface device 20 (120) is attached on the basis of a control signal output from a ultrasonic vibrator control unit 31 to be described later. In this embodiment, the transmission unit 21 transmits an ultrasonic wave toward the inside of the wrist which is an object to be sensed.

The reception unit 22 receives at least one of an ultrasonic wave (reflected wave) obtained when the ultrasonic wave output from the transmission unit 21 is reflected on the internal tissue of the wrist of the user 1 or an ultrasonic wave (transmitted wave) obtained when the ultrasonic wave output from the transmission unit 21 is transmitted through the internal tissue of the wrist of the user 1. The ultrasonic wave is transmitted through the tendon 43 and the muscle 44 and is reflected on a bone such as the radial bone 42 and the elbow bone 41. The structure of the ultrasonic vibrator 10 (100) will be described later.

The control unit 23 includes an ultrasonic vibrator control unit 31, a database 32, a signal processing unit 33, a finger movement recognition unit 34, and a communication unit 35.

The ultrasonic vibrator control unit 31 outputs to the transmission unit 21 a control signal of a voltage applied between electrodes of the ultrasonic vibrator 10 (100).

The database 32 stores learning data for reference in which various types of hand movement information taken by a wearer wearing the ultrasonic user interface device 20 (120) and information related to a reception result for comparison received by the reception unit 22 when the movement is performed are associated with each other. The data for reference is obtained in advance.

The information related to the reception result for comparison includes waveform data of the electrical signal of the transmitted wave or the reflected wave, which is the reception result for comparison itself, an ultrasonic image constructed on the basis of the reception result for comparison, and the like. Here, the ultrasonic image will be described as an example.

The ultrasonic image is an image of the internal tissue structure of the wrist on the basis of the reception result received by the reception unit 22 by applying ultrasonic waves to the forearm part (here, the wrist).

The data for reference is obtained by learning changes in the structure of internal tissues including muscles and tendons inside the wrist when the fingers and wrists are moved to take various hand forms through machine learning. By referring to the already obtained data for reference, the gesture (movement of the wrist and the hand fingers) of the user 1 is recognized from the ultrasonic image of the inside of the wrist which is obtained by the ultrasonic user interface device (120).

The signal processing unit 33 processes the electrical signal of the reflected wave or the transmitted wave of the ultrasonic wave which is the reception result for recognition received by the reception unit 22 as the ultrasonic image. The constructed ultrasonic image is output to the finger movement recognition unit 34.

Moreover, the signal processing unit 33 may detect the positions of the ultrasonic vibrators 10 (100) by a triangulation method using reception results received by a plurality of ultrasonic vibrators 10 (100). The detection results are output to the finger movement recognition unit 34.

The finger movement recognition unit 34 refers to the database 32, analyzes the ultrasonic image constructed by the signal processing unit 33, recognizes the movement of the wrist and the hand fingers, and obtains the movement information.

Moreover, the finger movement recognition unit 34 may correct positional deviation that is caused when the ultrasonic user interface device 20 (120) is attached, by using the detection results of the positions of the plurality of ultrasonic vibrators 10 (100) detected by the signal processing unit 33. After the positional deviation is corrected, the ultrasonic image may be analyzed by referring to the database 32 and the movement information of the wrist and the hand fingers may be obtained.

The communication unit 35 is configured to be capable of communicating with an external device (not shown). The communication unit 35 transmits to the external device (not shown) the movement information of the wrist and the hand fingers recognized by the finger movement recognition unit 34.

In the external device, the obtained movement information of the wrist and hand fingers is reflected to the movement of the wrist and hand fingers of the avatar of the user 1 displayed in the game image, for example, and an image that reproduces the movement of the user 1 is generated. Accordingly, the user 1 can view the avatar in which the movement of his or her own body is reproduced on the image, and for example, it is possible to enjoy the sense of presence, immersion, and reality in a virtual reality (VR) game.

It should be noted that the example in which the obtained movement information of the wrist and the hand fingers is used for the game image has been described here, though not limited thereto. The movement information of the wrists and the hand fingers may be used for remote operation of a robot in a medical or production site. For example, it can also be applied to remote operation of a robot hand in which a multi-finger articulated robot hand is driven using the movement information of the wrist and the hand fingers of the user 1 to reproduce movement of the wrist and the hand fingers of the user 1.

Moreover, although the example in which the reception result is processed as the ultrasonic image, the waveform data of the electrical signal of the transmitted wave or reflected wave which is the reception result itself may be used without constructing the ultrasonic image.

In this case, the database 32 stores data for reference including information about various hand forms and waveform data (reception result for comparison) received by the reception unit 22 when the form is taken, which are obtained in advance and associated with each other. The signal processing unit 33 receives the reception result for recognition received by the reception unit 22, specifically, the electrical signal of the reflected wave or transmitted wave. The finger movement recognition unit 34 refers to the database 32, analyzes the waveform data of the reflected wave or the transmitted wave received by the signal processing unit 33 by pattern matching, recognizes the movement of the wrist and the hand fingers, and obtains the movement information.

Next, a specific structure example of the ultrasonic user interface device will be described by exemplifying an embodiment. In the following embodiment, an ultrasonic user interface device of a wristband-type wearable device attached to the wrist will be shown as an example. The ultrasonic user interface device is a detection device that detects the movement of the wrist and the hand fingers. Moreover, in each embodiment, similar components will be denoted by similar reference signs and descriptions thereof will be omitted in some cases.

First Embodiment

Configuration of Ultrasonic User Interface Device

Figure 4:
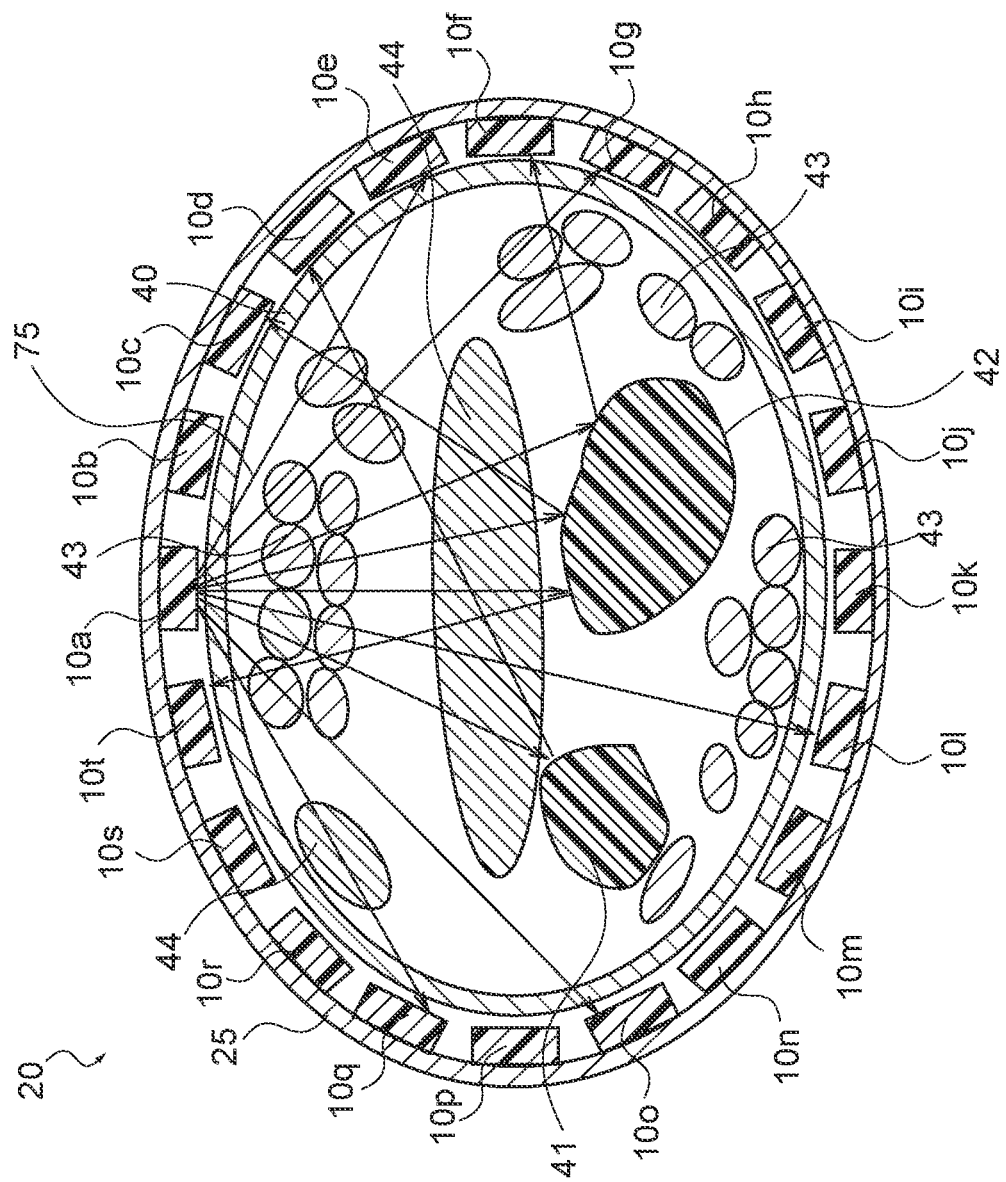
FIG. 4 A schematic cross-sectional view of a wrist of the user wearing an ultrasonic user interface device according to a first embodiment of the present technology.

FIG. 4 is a schematic cross-sectional view of the wrist of the user 1 wearing the ultrasonic user interface device 20 according to this embodiment.

As shown in FIG. 4, the ultrasonic user interface device 20 includes an attachment band 25 as an accessory made from a band-like member having the ring shape, a plurality of ultrasonic vibrators 10a to 10t, and an IC chip (not shown) incorporating the control unit 23.

The attachment band 25 holds the ultrasonic vibrators 10a to 10t and is configured to be wearable on the wrist of the user 1. The attachment band 25 is configured by forming the a band-like member surrounding the wrist of the user 1 in the ring shape.

The ultrasonic vibrators 10a to 10t are arranged on a side of the attachment band 25 on which the attachment band 25 is held in contact with the skin 40. By the attachment of the attachment band 25, the ultrasonic vibrators 10a to 10t are held in contact with and fixed to the wrist of the user 1. The plurality of ultrasonic vibrators 10a to 10t are arranged so as to surround the wrist at intervals in the circumferential direction of the wrist when the ultrasonic user interface device 120 is worn.

In this embodiment, an example in which 20 ultrasonic vibrators 10a to 10t are provided is shown, though the number of ultrasonic vibrators 10 is not limited thereto. Moreover, in this embodiment, a single ultrasonic vibrator including one ultrasonic vibration element will be described as an example, though it may be an array-type ultrasonic vibrator 100 or 100' to be described later.

In this embodiment, each of the ultrasonic vibrators 10a to 10t transmits an ultrasonic wave toward the inside of the wrist of the user 1. Moreover, the ultrasonic vibrators 10a to 10t each receive an ultrasonic wave (reflected wave) reflected on the internal tissue of the wrist by the ultrasonic wave transmitted by itself and further receive an ultrasonic wave (transmitted wave) transmitted from another ultrasonic vibrator and transmitted through the internal tissue or an ultrasonic wave (reflected wave) reflected on the internal tissue and arriving.

The IC chip includes the control unit 23. The IC chip may be disposed on a surface side of the attachment band 25 on which the attachment band 25 is in contact with the skin of the user 1 or may be disposed on an opposite surface side. The IC chip electrically connects with each of the ultrasonic vibrators 10a to 10t.

Structure of Ultrasonic Vibrator

Figure 5:
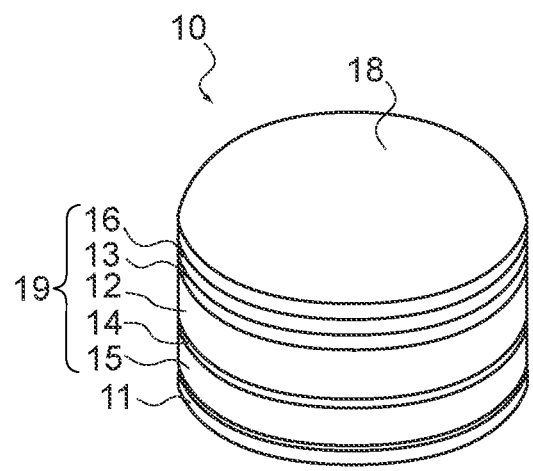
FIG. 5 A schematic perspective view of an ultrasonic vibrator provided in the ultrasonic user interface device according to the first embodiment.
Figure 5:
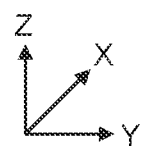
Figure 12:
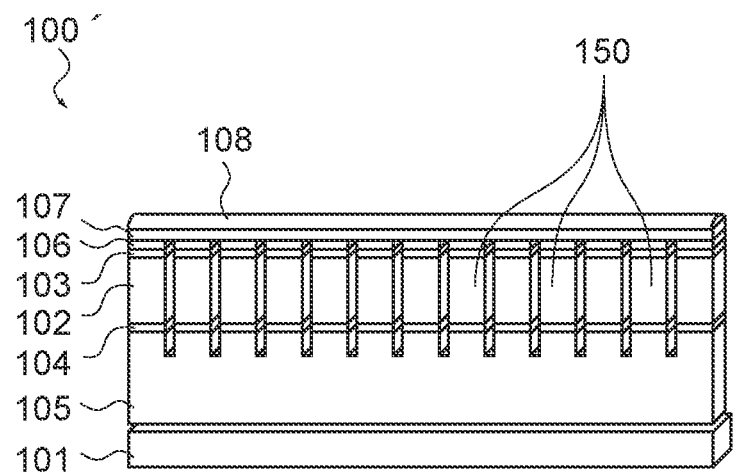
FIG. 12 A perspective view of another array-type ultrasonic vibrator that constitutes a part of the ultrasonic user interface device according to the fifth embodiment.

Next, a configuration of the ultrasonic vibrator 10 will be described. FIG. 5 is a perspective view of the ultrasonic vibrator 10. In FIG. 5 and FIGS. 12 and 13 to be described later, it is assumed that three directions orthogonal to one another are an X direction, a Y direction, and a Z direction, respectively.

Figure 6:
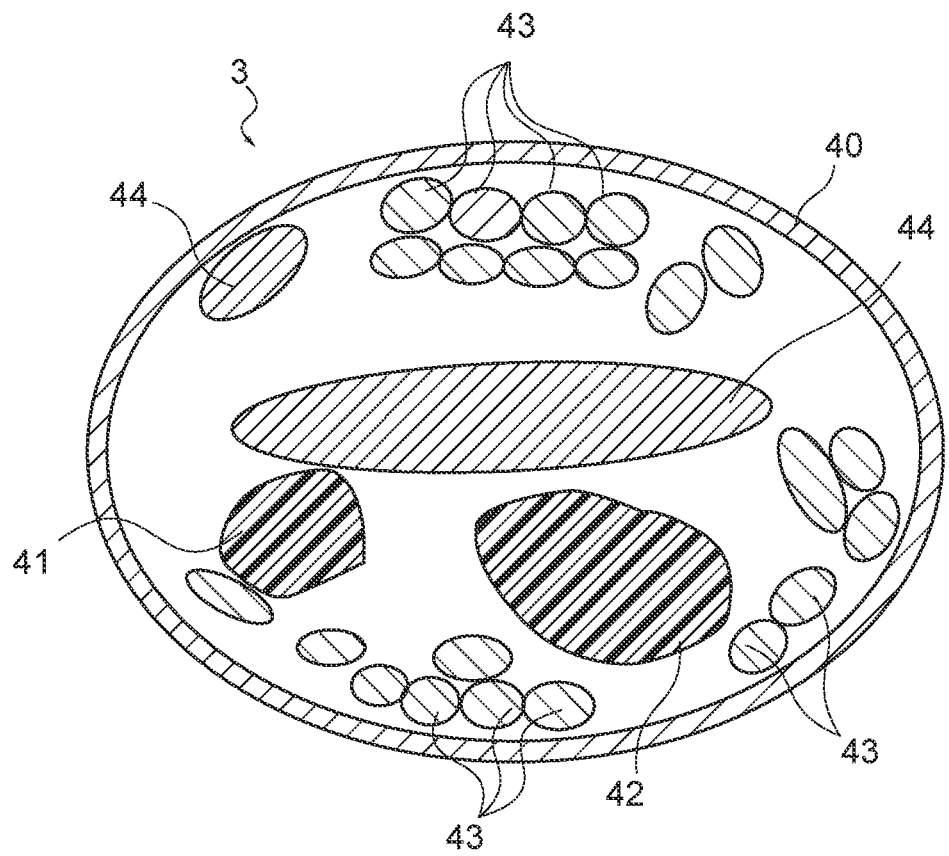
FIG. 6 An image of sensing data obtained by the ultrasonic user interface device according to the first embodiment.

The ultrasonic vibrator 10 is a single ultrasonic vibrator. As shown in FIG. 6, the ultrasonic vibrator 10 includes a substrate 11, a piezoelectric layer 12, an upper electrode layer 13, a lower electrode layer 14, a backing layer 15, an acoustic matching layer 16, and an acoustic lens 18.

The piezoelectric layer 12, the upper electrode layer 13, the acoustic matching layer 16, the lower electrode layer 14, and the backing layer 15 constitute a vibrator element 19.

The substrate 11 is a wiring board such as a rigid printed circuit board and a flexible printed circuit (FPC) board made from glass epoxy and the like, and supports and electrically connects the vibrator element 19. Substrate built-in resistance elements (not shown), wires, and pads are provided on the substrate 11.

The piezoelectric layer 12 is made from a piezoelectric material such as lead zirconate titanate (PZT). The piezoelectric layer 12 is provided between the lower electrode layer 14 and the upper electrode layer 13, and generates vibration due to the reverse piezoelectric effect and generates ultrasonic waves when a voltage is applied between the lower electrode layer 14 and the upper electrode layer 13. Moreover, when the reflected wave or transmitted wave from the inside of the human body enters the piezoelectric layer 12, polarization is caused due to the piezoelectric effect. Although the size of the piezoelectric layer 12 is not particularly limited, it may be 250 μm square, for example.

The upper electrode layer 13 is provided on the piezoelectric layer 12, is made from a conductive material, and a metal formed as a film by plating, sputtering, or the like, for example.

The lower electrode layer 14 is provided on the backing layer 15, is made from a conductive material, and a metal formed as a film by plating, sputtering, or the like, for example.

The backing layer 15 is provided on the substrate 11 to absorb unwanted vibration of the vibrator element 19. The backing layer 15 is generally made from a material obtained by mixing a filler and a synthetic resin, and the like. Wires for connecting the lower electrode layer 14 and the pads are provided in the backing layer 15.

The acoustic matching layer 16 reduces the difference in acoustic impedance between the human body and the vibrator element 19 and prevents reflection of ultrasonic waves to an object to which the ultrasonic waves are to be transmitted. The acoustic matching layer 16 is made from a synthetic resin or a ceramic material.

The acoustic lens 18 focuses the ultrasonic waves generated in the piezoelectric layer 12. The acoustic lens 18 is made from silicone rubber and the like, for example, and its size and shape are not particularly limited.

The upper electrode layer 13, the lower electrode layer 14, and the piezoelectric layer 12 positioned between the electrode layers constitute the transmission unit 21 that transmits an ultrasonic wave to the inside of the human body of the user 1, and also constitutes the reception unit 22 that receives an ultrasonic wave (reflected wave) reflected on the internal tissue inside the human body. Thus, in this embodiment, a configuration in which the vibrator element 19 serves as both the transmission unit and the reception unit is employed.

In this embodiment, the ultrasonic vibrator for transmission and reception including the vibrator element that serves as both the transmission unit and the reception unit is shown as an example of the ultrasonic vibrator 10, though not limited thereto. A vibrator element for transmission having a transmission unit of an ultrasonic wave and a vibrator element for reception having a reception unit for receiving the reflected wave or the transmitted wave may be provided separately to constitute a single ultrasonic vibrator for transmission and reception.

Description of Operation of Ultrasonic Vibrator in Ultrasonic User Interface Device In this embodiment, the ultrasonic vibrators operate such that when one ultrasonic vibrator 10 of the plurality of ultrasonic vibrators 10a to 10t functions as the transmission unit 21 and the reception unit 22, the other ultrasonic vibrators 10 function as the reception units 22.

That is, the one ultrasonic vibrator 10 functions as the transmission unit 21 to transmit an ultrasonic wave and also functions as the reception unit 222 to receive a reflected wave reflected on the internal tissue of the wrist. The other ultrasonic vibrators 10 each receive a transmitted wave obtained when the ultrasonic wave transmitted by the one ultrasonic vibrator 10 is transmitted through the internal tissue of the wrist and a reflected wave obtained when the ultrasonic wave transmitted by the one ultrasonic vibrator 10 is reflected on the internal tissue.

Then, the series of transmission and reception operations of ultrasonic waves is performed for each plurality of ultrasonic vibrators 10a to 10t, and the ultrasonic image of the inside of the wrist is reconstructed on the basis of the reception result obtained by each ultrasonic vibrator 10.

A specific operation example of the ultrasonic vibrator will be described with reference to FIG. 4. Each of the ultrasonic vibrators 10a to 10t is first controlled on the basis of the control signal output from the control unit 23 such that the ultrasonic vibrator 10a functions as the transmission unit 21 and the reception unit 22 and the other ultrasonic vibrators 10b to 10t function as the reception unit 22.

Ultrasonic waves 75 are transmitted from the ultrasonic vibrator 10a that functions as the transmission unit 21 and the inside of the wrist is scanned. The ultrasonic waves are is transmitted through the tendon 43 and the muscle 44 and are reflected on the bones 41 and 42. The ultrasonic waves (reflected waves) reflected on the bones 41 and 42 and the ultrasonic waves (transmitted waves) transmitted through the tendon 43 and the muscle 44 are received by the ultrasonic vibrators 10a to 10t that function as the reception units 22.

In the example shown in FIG. 4, the reflected waves reflected on the radial bone 42 are received by the ultrasonic vibrators 10c, 10f, and 10t. The reflected wave reflected on the elbow bone 41 is received by the ultrasonic vibrator 10d.

It should be noted that reflected waves other than those reflected on the bones 41 and 42 are omitted from the figure. At the boundary between the tendon 43 and the internal tissue different from the tendon 43, which excludes bones, and at the boundary between the muscle 44 and the internal tissue different from the muscle 44, which excludes bones, reflected waves are generated due to the difference in acoustic impedance, and non-reflected ultrasonic waves transmit therethrough. These reflected waves and transmitted waves are received by the ultrasonic vibrators 10a to 10t.

In the example shown in FIG. 4, transmitted waves transmitted through the tendon 43 and the muscle 44 without colliding with bones such as the elbow bone 41 and the radial bone 42 are received by the ultrasonic vibrators 10e, 10g, 10l, 10o, and 10q.

Accordingly, the reception results respectively received by the ultrasonic vibrators 10a to 10e when the ultrasonic vibrator 10a operates as the reception unit 22 are obtained.

Next, after the ultrasonic vibrator 10a functions as the transmission unit 21 and the reception unit 22, the control is made such that the ultrasonic vibrator 10b in turn functions as the transmission unit 21 and the reception unit 22 and the other ultrasonic vibrators 10a, 10c to 10t function as the reception units 22. Accordingly, the reception results respectively received by the ultrasonic vibrators 10a to 10e when the ultrasonic vibrator 10b operates as the reception unit 22 are obtained.

In this manner, each of the plurality of ultrasonic vibrators 10a to 10t sequentially functions as the transmission unit 21 to transmit ultrasonic waves and all of the ultrasonic vibrators 10a to 10t function as the reception units 22 to receive reflected waves and transmitted waves in each transmission of the ultrasonic waves from each of the ultrasonic vibrators 10a to 10t.

Accordingly, the reception results at the ultrasonic vibrators 10a to 10t that function as the reception units 22 for the scan performed by each of the ultrasonic vibrators 10a to 10t as the transmission unit 21, are obtained for each of the ultrasonic vibrators 10a to 10t.

Based on these obtained reception results, the signal processing unit 33 reconstructs an ultrasonic image of a wrist cross-section as shown in FIG. 6.

Since the plurality of ultrasonic vibrators is arranged so as to surround the wrist around the wrist, the plurality of ultrasonic vibrators can scan the inside of the wrist from the entire circumference of the wrist, and it is possible to obtain an accurate ultrasonic image of the wrist cross-section in a wide range.

By using such an accurate ultrasonic image of the wrist cross-section in the wide range, the movement of the wrist and hand fingers of the user 1 can be accurately recognized to obtain accurate movement information of the wrist and the hand fingers.

By using the accurate movement information of the wrist and the hand fingers, the movement of the wrist and the hand fingers of the user 1 can be accurately reproduced. For example, the movement of the user 1 can be accurately reproduced by using the obtained movement information of the user 1 to the avatar simulating the human as the user 1 which is displayed in the game image, and the user can be given the sense of presence and immersion in the game.

The driving of each of the ultrasonic vibrators 10a to 10t according to this embodiment is controlled by the ultrasonic vibrator control unit 31 shown in FIG. 3.

Moreover, the signal processing unit 33 reconstructs the ultrasonic image by using reception results for recognition received by the plurality of ultrasonic vibrators that functions as the reception units 22, which are obtained in each transmission of the ultrasonic waves from each ultrasonic vibrator that functions as the transmission unit 21, the transmission being sequentially performed.

In this embodiment, one of the plurality of ultrasonic vibrators is operated as a transmission unit and a reception unit, and other ultrasonic vibrators are operated as reception units to be driven, such that the number of vibrators independently driven as transmission units can be reduced in a single scan. Accordingly, it is possible to miniaturize the apparatus of the electronic circuit unit, and it is also possible to reduce the cost.

It should be noted that in this embodiment, the plurality of ultrasonic vibrators 10a to 10t are all set as the ultrasonic vibrators for transmission and reception each having both functions of the transmission unit 21 and the reception unit 22, though not limited thereto.

For example, a plurality of ultrasonic vibrators for transmission each having the function of only the transmission unit 21 and an ultrasonic vibrator for reception having the function of only the reception unit 22 may be each provided. As an example of the arrangement of the ultrasonic vibrators, the ultrasonic vibrator for transmission and the ultrasonic vibrator for reception may be alternately arranged such that those are positioned so as to surround the wrist in the circumferential direction of the wrist when it is worn to configure the ultrasonic user interface device.

In this case, ultrasonic waves are transmitted by one ultrasonic vibrator for transmission, reflected waves and transmitted waves are received by a plurality of ultrasonic vibrators for reception. This series of transmission/reception operations is performed in such a manner that the ultrasonic vibrator for transmission that functions as the transmission unit sequentially changes, and the reception result is obtained for each ultrasonic element for transmission. The ultrasonic image is reconstructed on the basis of the reception result.

In this embodiment, due to the attachment and detachment of the ultrasonic user interface device 20, the plurality of ultrasonic vibrators 10a to 10t may be deviated in position with respect to the wrist when it is worn.

In contrast, the position of the ultrasonic vibrator can be detected by the triangulation method using the reception result received by each of the ultrasonic vibrators 10a to 10t, to correct the positional deviation when it is worn. As a result, the recognition accuracy of the movement of the wrist and the movement of the hand fingers is not hindered. The signal processing unit 33 detects the position of the array-type ultrasonic vibrator by the triangulation method.

In this embodiment, the example in which the plurality of ultrasonic vibrators for transmission and reception is provided as the ultrasonic vibrators has been shown, though it is sufficient that at least one transmission unit 21 and a plurality of reception units 22 are arranged. The transmission unit 21 is arranged to transmit ultrasonic waves to the internal tissue of the wrist. The plurality of reception units 22 receives the ultrasonic waves transmitted or reflected on the internal tissue of the wrist and are arranged so as to surround the wrist in the circumferential direction of the wrist.

For example, one ultrasonic vibrator for transmission and a plurality of ultrasonic vibrators for reception may be provided. Accordingly, since the waves reflected and transmitted on/in the internal tissue out of the ultrasonic waves transmitted to the inside of the wrist from the one transmission unit 21 can be received by the plurality of reception units 22, it is possible to obtain detailed internal tissue information of the inside of the wrist.

Moreover, in addition to arranging the plurality of reception units 22, it is favorable to arrange a plurality of transmission units 21. The plurality of transmission units 21 is arranged so as to surround the wrist in the circumferential direction of the wrist.

Since the plurality of transmission units 21 is provided in that way, the wrist can be scanned from any direction, the plurality of reception units 22 can receive the reflected and transmitted waves of each scan, and a wide scan range can be secured. Thus, it is possible to observe a wide range of movements in the muscles and tendons inside the wrist, which improves the recognition accuracy of movements in the wrist and the hand fingers.

Moreover, in this embodiment, the example of image reconstruction based on the reception result of each of the plurality of ultrasonic vibrators has been shown, though image reconstruction is not necessarily required. The movement of the wrist and the hand fingers may be recognized (gesture recognition) by pattern matching using the obtained waveform data of the reflected waves and the transmitted waves without image reconstruction.

Second Embodiment

In the above embodiment, the example in which 20 ultrasonic vibrators for transmission and reception are provided has been shown, through the number of ultrasonic vibrators is not limited thereto. In the ultrasonic user interface device to be worn on the wrist, it is sufficient to provide at least five ultrasonic vibrators for transmission and reception, and it is desirable from the viewpoint of power consumption as the number of ultrasonic vibrators involved in one scan be smaller. Hereinafter, the reason why it is sufficient to provide at least five ultrasonic vibrators will be described with reference to FIG. 7.

Figure 7:
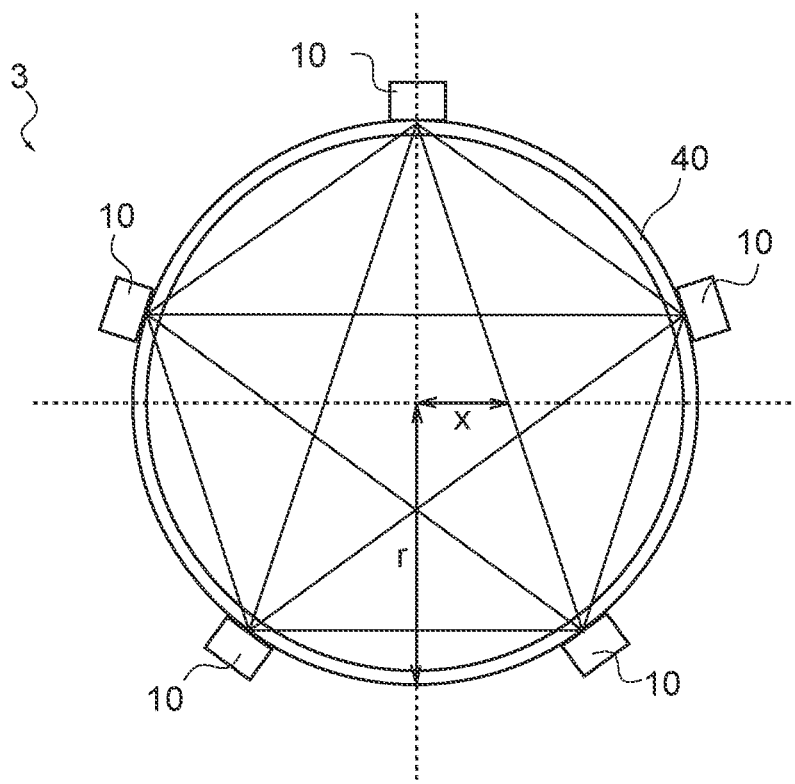
FIG. 7 A diagram for describing a favorable number of reception units provided in an ultrasonic user interface device according to a second embodiment, which is a schematic cross-sectional view of a wrist.

FIG. 7 is a cross-sectional view of the forearm part of an adult and it is shown assuming that the cross-section is similar to a true circle. In FIG. 7, ultrasonic vibrators for transmission and reception 10 are arranged around a skin 40 of a forearm part 3.

The muscle with the greatest cross-sectional area in the forearm of the adult is the flexor carpi ulnaris and its diameter is generally about 26 mm in a case where it is similar to the true circle.

Provided that the number of ultrasonic vibrators for transmission and reception 10 of the annular ultrasonic user interface device is N and the radius of the annular ultrasonic user interface device is r, the spatial resolution x of the ultrasonic computed tomography (CT) is expressed by the following expression by ray-tracing considerations.

$$\operatorname{Tan}\frac{\pi}{N} = \frac{x}{r}$$

of ultrasonic vibrators for transmission and reception 10 is made to function as a transmission unit and a reception unit, and other ultrasonic vibrators for transmission and reception are made to function as reception units to receive reflected waves and transmitted waves. In this case, when the minimum spatial resolution x that allows scanning the entire wrist cross-section by adding reflection by bone is determined using the above expression, it can be calculated that the number of ultrasonic vibrators for transmission and reception N may be 5 or more. It should be noted that at the time of calculation, the cross-section of the ulnar carpus flexor was regarded as a true circle of 26 mm in diameter, and the radius of the annular ultrasonic user interface device approximated to a true circle was set to 32 mm, which is the radius of the wrist of a general large-handle adult.

Assuming that the movement of the wrist and the hand fingers is recognized using ultrasonic tomographic images of the wrist, it was calculated that it is sufficient to provide at least five ultrasonic vibrators. It should be noted that since the geometric resolution becomes higher as the number of ultrasonic vibrators increases, six or more ultrasonic vibrators may be provided, and the number of ultrasonic vibrators to be used can be set as appropriate in consideration of the calculation cost for image reconstruction and the cost associated with the number of components.

In this embodiment, the forearm part has been taken as an example, through the upper arm part and the leg part are different in thickness from the forearm part and are generally thicker, such that the favorable minimum number of ultrasonic frequencies is larger than that in the case of the forearm part.

Moreover, in the above description, the number of ultrasonic vibrators is calculated on the assumption that the adult wears the ultrasonic user interface device. In a case where a child wears the ultrasonic user interface device, the favorable minimum number of ultrasonic vibrators is less than that in the case of the adult because the child has thinner wrists than the adult.

As described above, the number of ultrasonic vibrators to be used can be set as appropriate in accordance with the size of the body part to which the ultrasonic user interface device is attached.

Moreover, in the ultrasonic user interface device worn on the wrist, the example in which the ultrasonic vibrator for transmission and reception is used as the ultrasonic vibrator has been shown, through it is sufficient that at least one transmission unit 21 and at least five reception units 22 are provided. For example, one ultrasonic vibrator for transmission and reception and four ultrasonic vibrators for reception may be provided or one ultrasonic vibrator for transmission and five ultrasonic vibrators for reception may be provided.

Accordingly, since the plurality of reception units 22 can receive the waves reflected and transmitted on/in the internal tissue out of the ultrasonic waves transmitted from one transmission unit 21 and transmitted inside the wrist, it is possible to obtain detailed internal tissue information of the inside of the wrist.

Moreover, it is desirable to arrange at least five reception units 22 and at least five transmission units 21. For example, at least five ultrasonic elements for transmission and reception may be provided or at least five ultrasonic vibrators for transmission and at least five ultrasonic vibrators for reception may be provided.

Since at least five transmission units 21 are provided in that way, the wrist can be scanned from any direction. Then, the reflected and transmitted waves of each scan can be received by the plurality of reception units 22, and it is possible to obtain more accurate internal tissue information of the inside of the wrist.

Third Embodiment

As described above, data for reference is stored in the database 32. In the ultrasonic user interface device 20, when the user 1 wears the ultrasonic user interface device 20, an ultrasonic image of the wrist of the user 1 is constructed on the basis of the reception result (sensing data) for recognition received by the ultrasonic vibrator 10. Then, the data for reference is referenced and the movement information of the wrist and the hand fingers is obtained using the constructed ultrasonic image.

Here, the position of the ultrasonic vibrator with respect to the wrist when the ultrasonic user interface device 20 is worn and the data for reference is obtained and the position of the ultrasonic vibrator with respect to the wrist when the ultrasonic user interface device is worn by the user 1 and the sensing data for recognition is obtained can be deviated from each other.

Therefore, in this embodiment, the positional deviation of the ultrasonic vibrator with respect to the wrist from that when the data for reference is obtained is corrected by using the sensing data related to the ultrasonic waves reflected on the bone inside the wrist, and the movement information of the wrist and the hand fingers is obtained.

Accordingly, it is possible to suppress lowering of the recognition accuracy of the movement of the wrist and the fingers which is caused by the positional deviation of the ultrasonic vibrator due to the wearing deviation of the ultrasonic user interface device 20.

Figure 8:
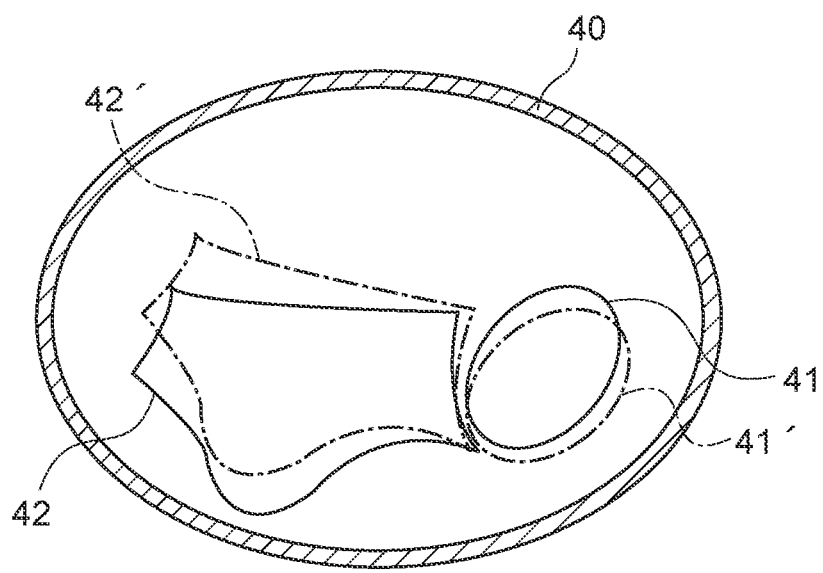
FIG. 8 A diagram for describing correction processing of a position of an ultrasonic vibrator of an ultrasonic user interface device according to a third embodiment.

Hereinafter, the description will be made with reference to FIG. 8. FIG. 8 is a cross-sectional view of a wrist for describing correction processing of the position of the ultrasonic vibrator.

In FIG. 8, portions indicated by the dot-dash lines indicate the position of a radial bone 42' and the position of an elbow bone 41' in an ultrasonic image in data for reference obtained in advance. The ultrasonic image in the data for reference is an ultrasonic image based on the reception result for comparison and is information related to a reception result for comparison.

In FIG. 8, portions indicated by the solid lines indicate the position of a radial bone 42 and the position of an elbow bone 41 in an ultrasonic image constructed on the basis of sensing data for recognition. The ultrasonic image in the sensing data for recognition is information related to a reception result for recognition. The sensing data for recognition includes information about the reflected waves related to the bone of the wrist of the user 1.

Here, the specific tendon 43 and muscle 44 move and change in shape by the movement of the fingers and the movement of the wrist while the shape of the bone is constant.

Therefore, in this embodiment, the ultrasonic image based on the sensing data is subjected to affine transformation, the position of the bone of the image subjected to affine transformation is aligned with the position of the bone of the learning data, and the azimuth of the ultrasonic image of the data for reference and the azimuth of the ultrasonic image based on the sensing data for recognition are adjusted. After performing this azimuth adjustment, the data for reference is referenced, the movement of the wrist and the hand fingers is recognized using the ultrasonic image based on the sensing data, and the movement information is obtained.

Accordingly, even if there is a positional deviation of the ultrasonic vibrator when the ultrasonic user interface device is worn, it is possible to suppress lowering of the recognition accuracy of the movements of the wrist and the fingers. It should be noted that in FIG. 8, as an example of the bone used for alignment, the radial bone 42 and the elbow bone 41 are taken as examples, though not limited thereto and other bones may be used.

As described above, the azimuth of the ultrasonic vibrator with respect to the wrist can be corrected by using the sensing data related to the bone. Moreover, although the wrist has been taken as an example here, the azimuth of the ultrasonic vibrator can be corrected also in the upper arm part and the leg part by using the waves reflected on the bones.

Fourth Embodiment

In each of the embodiments described above and the following embodiments, when the ultrasonic user interface device 20 is worn, an acoustic matching component may be provided between the ultrasonic vibrator 10 having the transmission unit 21 and the reception unit 22 and the arm part or leg part of the user 1. In this embodiment, an example in which an acoustic matching component is provided between the ultrasonic vibrator 10 and the wrist of the user 1.

Figure 9A:
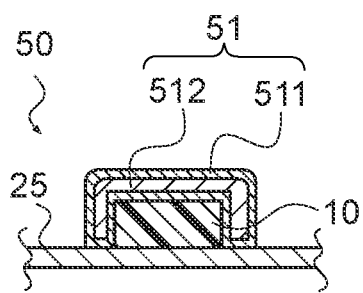
FIGS. 9A and 9B Schematic perspective views of an ultrasonic vibrator provided with an acoustic matching component provided in an ultrasonic user interface device according to a fourth embodiment.
Figure 9B:
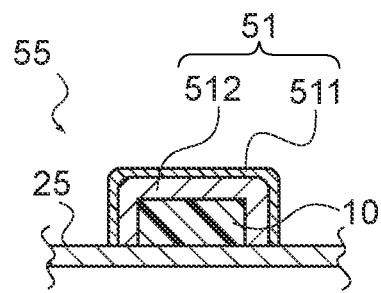

Hereinafter, the description will be made with reference to FIGS. 9A and 9B. FIGS. 9A and 9B shows partial views of an ultrasonic user interface device 20. FIG. 9A is a schematic cross-sectional view of an ultrasonic vibrator 50 with an acoustic matching component. FIG. 9B is a schematic cross-sectional view of an ultrasonic vibrator 55 with another acoustic matching component. Hereinafter, an ultrasonic vibrator with an acoustic matching component will be abbreviated as a component-equipped ultrasonic vibrator.

As shown in FIGS. 9A and 9B, both the component-equipped ultrasonic vibrators 50 and 55 both include an ultrasonic vibrator 10 and an acoustic matching component 51. The component-equipped ultrasonic vibrator 50, 55 is arranged on a side of the attachment band 25, which is on the skin 40 of the user 1 when the ultrasonic user interface device 20 is worn.

The acoustic matching component 51 is provided to cover the ultrasonic vibrator 10 disposed on the attachment band 25. The acoustic matching component 51 is provided on the acoustic lens 18 serving as the transmission surface and the reception surface of the ultrasonic waves.

The acoustic matching component 51 is disposed between the skin 40 of the user 1 and the ultrasonic vibrator 10 when the user 1 wears the ultrasonic user interface device 20. The acoustic matching component 51 is configured to be deformable to conform the shape of the surface of the skin 40 of the user 1 when it is worn.

The acoustic matching component 51 includes a deformable member 512 and a container 511 that houses the deformable member 512.

Biomaterials such as water, ethylene glycol, glycerin, oil, or collagen and the like, the acoustic impedance of which is 0.8 MRayls or more and 3 MRayls or less, which is close to a 1.5 MRayls which is an acoustic impedance of a living body, can be used for the deformable member 512. The deformable member 512 may be liquid or gel. The deformable member 512 is housed in the container 511 in a state in which generation of air bubbles is suppressed.

A nylon-based polymer material such as polyethylene, polyurethane, and polyether block amide, a natural or synthetic rubber material such as latex or nitrile, and the like, the acoustic impedance of which is 0.8 MRayls or more and 3 MRayls or less, which is close to a 1.5 MRayls which is an acoustic impedance of a living body, can be used for the container 511.

A material which is flexible and has a small thickness like a film, for example, can be used for the container 511. The container 511 only needs to be capable of housing the deformable member 512.

The container 511 may have a bag-like shape such that the housing space for housing the deformable member 512 is formed only by the container 511 as in the component-equipped ultrasonic vibrator 50 shown in FIG. 9A. Moreover, the container 511 may be configured to form the housing space for housing the deformable member 512 together with the ultrasonic vibrator 10 as in the component-equipped ultrasonic vibrator 55 shown in FIG. 9B.

A material that can be deformed into a shape in which the acoustic matching component 51 reflects fine undulations of the skin 40 of the user 1 when the acoustic matching component 51 is lightly pressed against the skin of the user 1 can be used for the container 511 and the deformable member 512.

Here, the reflection of the ultrasonic wave becomes stronger between the two media between which the acoustic impedance difference is larger. In this embodiment, since the acoustic matching component 51 disposed between the ultrasonic vibrator 10 and the skin 40 is constituted by the container 511 and the deformable member 512 each having the acoustic impedance of 0.8 MRayls or more and 3 MRayls or less, the reflectance of ultrasonic waves at the boundary between the acoustic matching component 51 and the skin 40 and the reflectance of ultrasonic waves at the boundary between the acoustic matching component 51 and the ultrasonic vibrator 10 can be 0.1 or less.

Accordingly, it is possible to reduce the ultrasonic waves repeatedly reflected at the boundary between the acoustic matching component 51 and the skin 40 and at the boundary between the acoustic matching component 51 and the ultrasonic vibrator 10, an ultrasonic image in which multiple echoes hardly occur is easily obtained, and it is possible to obtain a clear ultrasonic image.

The reflectance η at the boundary between the two media can be expressed by the following expression, where the acoustic impedance of one media is $Z_1$ and the acoustic impedance of the other media is $Z_2$.

$$\eta = \frac{(Z_1 - Z_2)}{(Z_1 + Z_2)}$$

s made oreover, the acoustic matching component 51 is made from a material that can be deformed to conform to the shape of the skin surface of the wrist when the ultrasonic user interface device 20 is worn. Accordingly, it is possible to reduce an air layer present between the component equipped ultrasonic vibrator 50 or 55 and the skin 40 of the user 1.

Thus, by reducing the present air layer that causes strong acoustic reflection, it is possible to smoothly transmit the ultrasonic waves transmitted by the ultrasonic vibrator 10 to the inside of the human body. Moreover, the ultrasonic vibrator 10 can smoothly receive ultrasonic waves transmitted into the body and transmitted through or reflected on the internal tissue. Accordingly, it is possible to obtain a more accurate ultrasonic image of the inside of the human body and to more accurately recognize the movement of the wrist and the hand fingers.

Moreover, in the acoustic matching component 51, since the deformable member 512 is housed in the container 511 with the generation of bubbles suppressed, the occurrence of strong reflection at the boundary between bubbles and the deformable member 512 is suppressed. Accordingly, it is possible to smoothly transmit and receive ultrasonic waves between the inside of the body and the ultrasonic vibrator 10.

Moreover, since the acoustic matching component 51 made from the material having the acoustic impedance in the above-mentioned range is provided, it is unnecessary to apply a sticky ultrasonic gel to the skin 40, which is generally used when the ultrasonic vibrator is used. Accordingly, it is unnecessary to wipe the used ultrasonic gel, which improves the convenience of the ultrasonic user interface device 20.

It should be noted that a surface-treated gelled acoustic matching material so as not to stick may be used as an acoustic matching component in another form.

Fifth Embodiment

In the embodiments described above, a single ultrasonic vibrator having one vibrator element is exemplified as the ultrasonic vibrator provided in the ultrasonic user interface device, through an array-type ultrasonic vibrator in which a plurality of vibrator elements is arranged may be used.

Configuration of Ultrasonic User Interface Device

Figure 10:
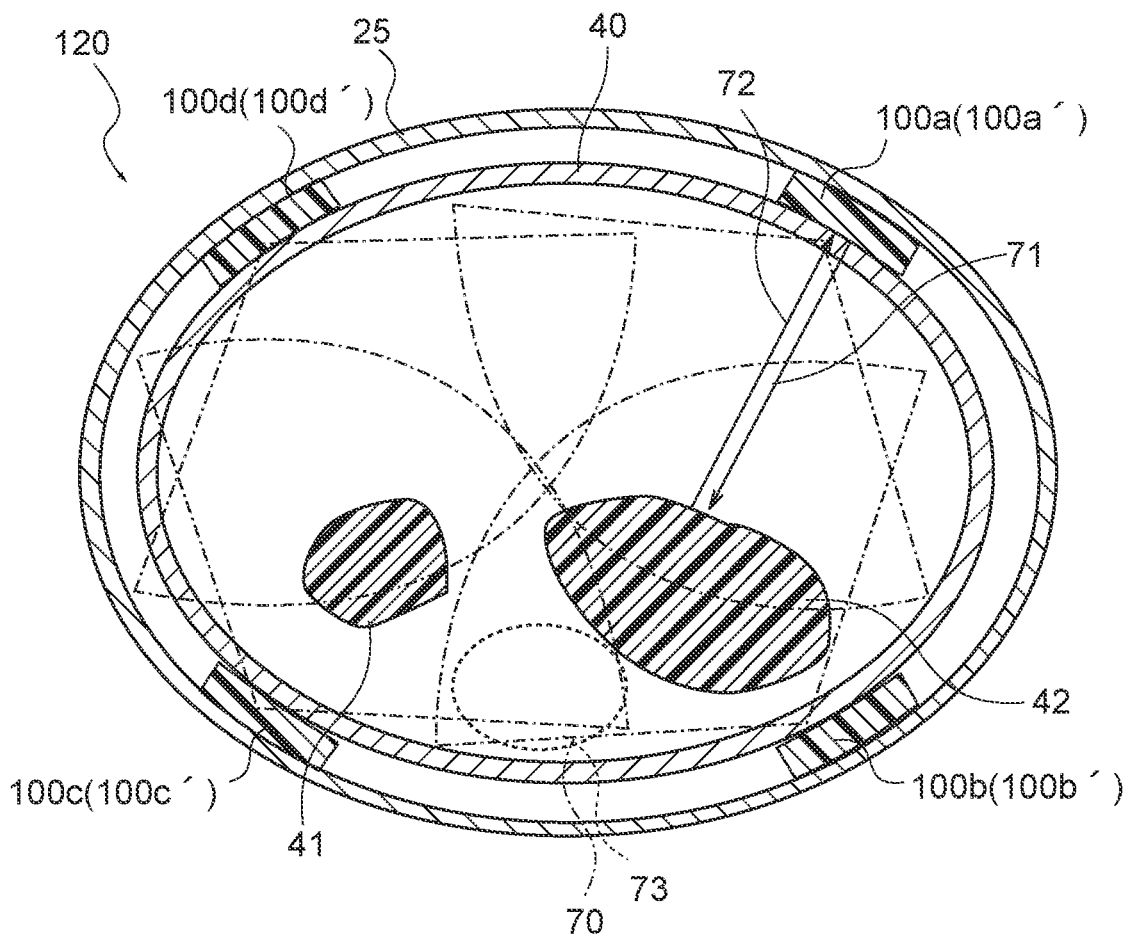
FIG. 10 A schematic cross-sectional view of a wrist of a user wearing an ultrasonic user interface device according to a fifth embodiment.

FIG. 10 is a schematic cross-sectional view of a wrist of a user 1 wearing an ultrasonic user interface device 120 according to this embodiment. The internal tissue of the wrist is partially omitted from FIG. 10.

As shown in FIG. 10, the ultrasonic user interface device 120 includes an attachment band 25, four array-type ultrasonic vibrators 100a to 100d (100a' to 100 d'), and an IC chip (not shown) including a built-in control unit 23.

The four array-type ultrasonic vibrators 100a to 100d (100a' to 100d') all have the same structure. If it is unnecessary to distinguish the four array-type ultrasonic vibrators 100a to 100d (100a' to 100d') from each other, they will be referred to as array-type ultrasonic vibrators 100 (100') in some cases.

As shown in FIG. 10, the plurality of array-type ultrasonic vibrators 100a to 100d (100a' to 100 d') is arranged around the wrist so as to surround the wrist, spaced apart from each other.

The IC chip includes the built-in control unit 23. The IC chip may be disposed on a surface side of the attachment band 25 on which the attachment band 25 is in contact with the skin of the user 1 or may be disposed on an opposite surface side. The IC chip is electrically connected to each of the ultrasonic vibrators 100a to 100d.

Structure of Array-Type Ultrasonic Vibrator

Figure 11:
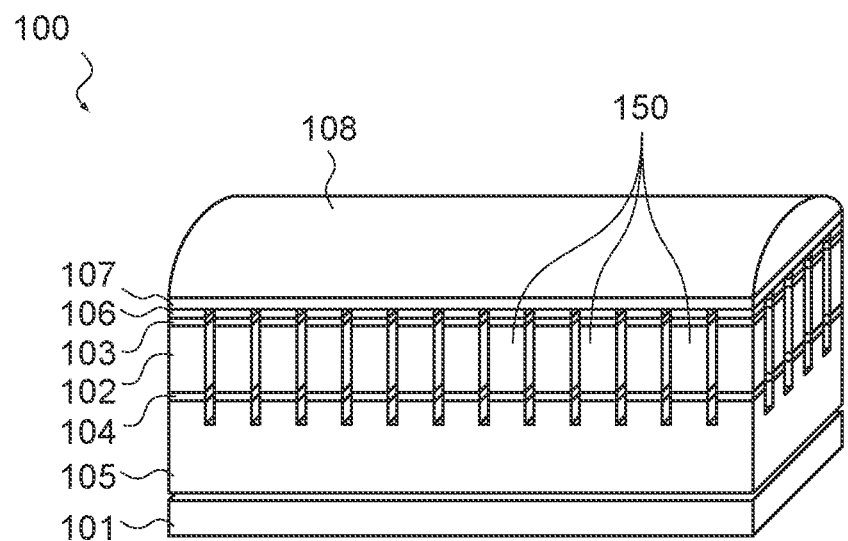
FIG. 11 A perspective view of an array-type ultrasonic vibrator that constitutes a part of the ultrasonic user interface device according to the fifth embodiment.

FIG. 11 is a perspective view of the array-type ultrasonic vibrator 100 according to this embodiment. In the array-type ultrasonic vibrator 100 of FIG. 11, vibrator elements 150 are arranged two-dimensionally.

FIG. 12 is a perspective view of another example of the array-type ultrasonic vibrator 100'. In the array-type ultrasonic vibrator 100' of FIG. 12, vibrator elements 150 are arranged in a row and arranged one-dimensionally.

In this embodiment, a vibrator in which the vibrator elements 150 shown in FIG. 11 are two-dimensionally configured may be used or a vibrator in which the vibrator elements are one-dimensionally configured as shown in FIG. 12 may be used as the array-type ultrasonic vibrator.

The array-type ultrasonic vibrator 100 or 100' transmits ultrasonic waves toward the wrist of the user 1. The ultrasonic waves (reflected waves) reflected inside the wrist are received by the array-type ultrasonic vibrator 100 or 100' and the reception results are used for constructing an ultrasonic image of an object to be observed.

As shown in FIG. 11 (FIG. 12), the array-type ultrasonic vibrator 100 (100') includes a substrate 101, a piezoelectric layer 102, an upper electrode layer 103, a lower electrode layer 104, a backing layer 105, an acoustic matching layer 106, an acoustic matching layer 107, and an acoustic lens 108.

The piezoelectric layer 102, the upper electrode layer 103, the acoustic matching layer 106, the lower electrode layer 104, and a part of the backing layer 105 are separated from each other and each of them constitutes the vibrator elements 150. That is, the array-type ultrasonic vibrator 100 (100') is an array of vibrator elements 150.

The materials used for the substrate 101, the piezoelectric layer 102, the upper electrode layer 103, the lower electrode layer 104, the backing layer 105, the acoustic matching layer 106, the acoustic matching layer 107, and the acoustic lens 108, respectively, are similar to those for the substrate 11, the piezoelectric layer 12, the upper electrode layer 13, the lower electrode layer 14, the backing layer 15, the acoustic matching layer 16, and the acoustic lens 18 described in the above-mentioned first embodiment.

The substrate 101 is a wiring board and supports and electrically connects the vibrator elements 150. Substrate built-in resistance elements, wires, independent wires, and pads are provided on the substrate 101.

The pads are provided on the surface of the substrate 101 and the respective vibrator elements 150 are electrically connected thereto. The wires electrically connect the pads and the substrate built-in resistance elements. The respective vibrator elements 150 are connected to the substrate built-in resistance elements via the wires and the pads. The independent wires are electrically connected to the substrate built-in resistance elements.

The piezoelectric layer 102 is provided between the lower electrode layer 104 and the upper electrode layer 103 and generates vibration due to the reverse piezoelectric effect and generates ultrasonic waves when a voltage is applied between the lower electrode layer 104 and the upper electrode layer 103. Moreover, when the reflected wave from the diagnostic object enters the piezoelectric layer 102, polarization is caused due to the piezoelectric effect.

The upper electrode layer 103 is provided on the piezoelectric layer 102. It should be noted that the upper electrode layer 103 may be separated for each vibrator element 150 as shown in FIG. 11 (FIG. 12) or does not need to be separated for each vibrator element 150.

The lower electrode layer 104 is provided on the backing layer 105. The lower electrode layer 104 is electrically connected to the substrate 101 via wires.

The backing layer 105 is provided on the substrate 101 to absorb unwanted vibration of the vibrator element 150. Wires for connecting the lower electrode layer 104 and the pads are provided in the backing layer 105.

The acoustic matching layer 106 and the acoustic matching layer 107 reduce the difference in acoustic impedance between the human body and the vibrator element 150 and prevent reflection of ultrasonic waves to the human body. As shown in FIG. 11 (FIG. 12), the acoustic matching layer 106 can be configured to be separated for each vibrator element 150 and the acoustic matching layer 107 can be configured not to be separated, though not limited thereto.

The acoustic lens 108 is held in contact with the skin 40 and focuses the ultrasonic waves generated in the piezoelectric layer 102.

The vibrator element 150 constitutes a transmission unit that outputs ultrasonic waves to the inside of the human body of the user 1 and also constitutes a reception unit that receives ultrasonic waves (reflected waves) obtained when the ultrasonic waves are reflected on the internal tissue inside the human body.

In the array-type ultrasonic vibrator 100, the plurality of vibrator elements 150 is arranged in two directions in the X and Y directions as viewed in the thickness direction (Z direction) of the vibrator element 150. In the array-type ultrasonic vibrator 100', the plurality of vibrator elements 150 is arranged in one row in the Y direction as viewed in the thickness direction (Z direction) of the vibrator element 150.

The short-side direction (X direction) of the array-type ultrasonic vibrator 100 is called slice direction (or elevation direction) and the resolution in the same direction corresponds to the resolution in the depth direction in the ultrasonic image. The number of the vibrator elements 150 in the slice direction is not particularly limited and only needs to be plural.

The longitudinal direction (Y direction) of the array-type ultrasonic vibrators 100 and 100' is called azimuth direction and the resolution in the same direction corresponds to the resolution in the azimuth direction in ultrasonic imaging. The number of the vibrator elements 150 in the azimuth direction is not particularly limited and only needs to be plural.

In this embodiment, when the user 1 wears the ultrasonic user interface device 120, the array-type ultrasonic vibrators 100 or 100' are fixed to the attachment band 25 such that the azimuth direction serving as the electronic scanning direction is parallel to the circumferential direction of the wrist, as shown in FIG. 10. Accordingly, the ultrasonic image of the cross-section of the wrist cut in a plane orthogonal to the longitudinal direction of the forearm part 3 is obtained.

As described above, in this embodiment, the array-type ultrasonic vibrators 100 or 100' are fixed to the attachment band 25 such that the azimuth direction and the circumferential direction of the wrist are parallel when the user 1 wears the ultrasonic user interface device 120.

As described above, it is desirable that the plurality of vibrator elements of the array-type ultrasonic vibrator be arranged in the circumferential direction of the wrist, and the wrist can be scanned in a wide range along the wrist cross-section, and internal tissue information of the wrist in the wide range can be obtained.

A known method can be used as a scanning method of the array-type ultrasonic vibrator 100 or 100'. In order to obtain a wrist cross-section image in a wide range, it is favorable that an ultrasonic beam in a range wider than the opening width of the ultrasonic vibrator can be scanned, and sector scanning, phased array scanning, convex scanning, or the like can be used.

In the sector scanning, ultrasonic beams can be scanned in a fan shape. Ultrasonic beams can be scanned in a fan shape by using a sector-type ultrasonic vibrator having a small opening that transmits ultrasonic waves radially from a single point.

In the phased array scanning, it is possible to focus ultrasonic waves to an arbitrary position or to propagate ultrasonic waves in any direction by electronically controlling each of the plurality of vibrator elements, and the ultrasonic beams can be scanned in a fan shape or trapezoidal shape.

In the convex scanning, ultrasonic beams can be scanned in a trapezoidal shape. Ultrasonic beams can be scanned in a trapezoidal shape by using a convex-type ultrasonic vibrator that transmits ultrasonic waves are in a trapezoidal shape through a plurality of vibrator elements arranged in a convex curved shape. In addition, virtual convex scanning in which ultrasonic beams are scanned in a trapezoidal shape by using a sector-type ultrasonic vibrator or a linear-type ultrasonic vibrator can be used.

As described above, in this embodiment, scanning can be performed with ultrasonic waves 70 in a fan shape or trapezoidal shape in a range wider than the opening width of the array-type ultrasonic vibrator 100 or 100' that transmits ultrasonic waves as shown in FIG. 10. Accordingly, it is possible to image the cross-section of the wrist in a range wider than the opening width of the array-type ultrasonic vibrator 100 or 100'.

The convex-type ultrasonic vibrators have a larger shape because of their convex shape. On the other hand, sector-type and linear-type ultrasonic vibrators and the ultrasonic vibrators used for phased array scanning can be more miniaturized than the convex-type ultrasonic vibrator.

It is more favorable to use such a type of ultrasonic vibrators that can be miniaturized in the ultrasonic user interface device 120. By using such a type of ultrasonic vibrators that can be miniaturized, it is possible to efficiently bring the reception and transmission surfaces of the ultrasonic vibrator into contact with the skin 40 of the user 1 when the ultrasonic user interface device 120 is worn. Accordingly, a more accurate ultrasonic image can be obtained.

It should be noted that even a type of ultrasonic vibrators that can be miniaturized can scan a range wider than the opening width of the ultrasonic vibrator by scanning in a trapezoidal shape or a fan shape, and the scan range can be widened.

Description of Operation of Array Ultrasonic Vibrators in Ultrasonic User Interface Device As shown in FIG. 10, the array-type ultrasonic vibrators 100a to 100d (100a' to 100 d') respectively transmit ultrasonic waves toward the inside of the wrist of the user 1, and the inside of the wrist is scanned with ultrasonic waves 70 in a fan shape or trapezoidal shape. The ultrasonic waves (reflected waves) reflected inside the wrist are received by the array-type ultrasonic vibrators 100 which had transmitted the ultrasonic waves. An ultrasonic image of the inside of the wrist is generated on the basis of the reception result of each of the four array-type ultrasonic vibrators 100a to 100d (100a' to 100d').

Here, regarding the ultrasonic waves transmitted toward the inside of the wrist, since bones hardly transmit ultrasonic waves, the ultrasonic wave reflectance at a bone surface greatly increases. Therefore, in the example shown in FIG. 10, a part 71 of the ultrasonic wave transmitted from the array-type ultrasonic vibrator 100a (100a') is reflected on the radial bone 42 and becomes a reflected wave 72. Therefore, in the array-type ultrasonic vibrator 100a, it is difficult to obtain the internal tissue information of the region 73 beyond the bone in the traveling direction of the ultrasonic wave 71 as viewed from the array-type ultrasonic vibrator 100a, and the region 73 of the ultrasonic image becomes considerably dark and shadowed.

In this embodiment, since the plurality of array-type ultrasonic vibrators 100 having both functions of the transmission unit and the reception unit is provided so as to surround the wrist, it is possible to obtain an ultrasonic image of a cross-section of the wrist as viewed from any position around the wrist.

Accordingly, an image of a region, which is darkened by the presence of a bone in the ultrasonic image based on the reception result at one array-type ultrasonic vibrator 100 (100'), can be obtained as a clear image at another array-type ultrasonic vibrator 100.

For example, in the example shown in FIG. 10, the internal tissue information of the region 73 which is difficult to obtain by the array-type ultrasonic vibrator 100a (100a') can be obtained by the other array-type ultrasonic vibrators 100b (100b') or 100c (100c').

In reconstruction of the ultrasonic image based on the reception results received by the plurality of array-type ultrasonic vibrators 100a to 100d (100a' to 100d'), the ultrasonic image can be reconstructed using the internal tissue information obtained by the other array-type ultrasonic vibrators for the internal tissue information in the region that is difficult to obtain by each array-type ultrasonic vibrator alone.

Thus, the reconstructed ultrasonic image is an ultrasonic image without regions that are shadowed and unclear due to the presence of bones.

Thus, in order to obtain an ultrasonic image of a cross-section of the wrist in which there is no region which is shadowed due to the presence of bones and which becomes an unclear ultrasonic image, it is desirable to provide at least four array-type ultrasonic vibrators 100 (100').

By arranging four or more array-type ultrasonic vibrators 100 (100') so as to surround the wrist, ultrasonic waves can be transmitted in substantially all directions to the inside of the wrist, and internal tissue information of muscles, tendons, and the like inside the wrist can be obtained. This makes it possible to recognize the movement of most internal tissues inside the wrist, and to more correctly obtain the wrist movement and finger movement information.

Here, due to the attachment and detachment of the ultrasonic user interface device 220, the plurality of array-type ultrasonic vibrators 100a to 100d (100a' to 100d') may be deviated in position with respect to the wrist when it is worn.

In this embodiment, an ultrasonic image is obtained by each of the array-type ultrasonic vibrators 100a to 100d (100a' to 100d'), and the position of the array-type ultrasonic vibrator 100 can be detected by the triangulation method to correct the positional deviation when it is worn. Accordingly, the recognition accuracy of the movement of the wrist and the movement of the hand fingers is not hindered.

As described above, since the plurality of array-type ultrasonic vibrators 100 (100') is provided, it is possible to more accurately recognize the movement of the internal tissue of the wrist, and it is possible to more correctly recognize the movement of the wrist and the hand fingers.

Embodiments of the present technology are not limited to the above-mentioned embodiments, and various modifications can be made without departing from the gist of the present technology.

For example, in the above description, the example in which the ultrasonic user interface device 20 (120) that is the wearable device worn by the user 1 includes the control unit 23 that performs a series of processes related to finger movement recognition as shown in FIG. 3 has been shown, though not limited thereto.

As an example, the control unit 23 is not provided in the attachment band 25 to be attached to the wrist of the user 1 and may be provided in an external information processing apparatus. In this case, the attachment band 25 including the ultrasonic vibrator and the external information processing apparatus constitute an ultrasonic user interface system. The attachment band 25 is provided with a communication unit capable of receiving a control signal for controlling the ultrasonic vibrator from the external information processing apparatus and transmitting a reception signal received by the ultrasonic vibrator to the external information processing apparatus.

It should be noted that the present technology may also take the following configurations.

(1) An ultrasonic user interface device, including:
- a transmission unit that transmits an ultrasonic wave toward an internal tissue of an arm part or a leg part of a user; and
- a plurality of reception units that is arranged so as to surround the arm part or the leg part in a circumferential direction of the arm part or the leg part to which the ultrasonic wave is transmitted and that receives, for obtaining movement information of at least a part of the limbs of the user, at least one of an ultrasonic wave obtained when the ultrasonic wave is transmitted through the internal tissue or an ultrasonic wave obtained when the ultrasonic wave is reflected on the internal tissue.

(2) The ultrasonic user interface device according to (1), in which
the transmission unit includes a plurality of transmission units that is arranged in the circumferential direction of the arm part or the leg part.

(3) The ultrasonic user interface device according to (1) or (2), in which
the reception unit includes at least five reception units.

(4) The ultrasonic user interface device according to (2) or (3), in which
the plurality of reception units receives at least one of ultrasonic waves sequentially transmitted by each of the plurality of transmission units and reflected on or transmitted through the internal tissue.

(5) The ultrasonic user interface device according to any one of (1) to (4), further including
a control unit that obtains movement information of at least a part of the limbs by using reception results for recognition received by the plurality of reception units.

(6) The ultrasonic user interface device according to (5), in which
the control unit obtains movement information of at least a part of the limbs by using a reception result for recognition received by each of the plurality of reception units obtained every time each of the plurality of transmission units transmits the ultrasonic wave.

(7) The ultrasonic user interface device according to (5) or (6), in which
the control unit refers to data for reference in which information according to the reception result for comparison received by the reception unit and the movement information of the limbs are associated with each other, which is obtained in advance, and obtains movement information of at least a part of the limbs from the reception result for recognition.

(8) The ultrasonic user interface device according to any one of (5) to (7), in which
the control unit corrects the positional deviation of the transmission unit and the reception unit with respect to the arm part or the leg part by using a reception result for recognition related to an ultrasonic wave reflected on a bone present in the inside, which is received by the reception unit, and obtains movement information of at least a part of the limbs.

(9) The ultrasonic user interface device according to (7), in which
the control unit refers to the data for reference in which waveform data of an ultrasonic wave for comparison received by the reception unit, which is obtained in advance, and the movement information of the limbs are associated with each other, and obtains movement information of at least a part of the limbs from waveform data of an ultrasonic wave for recognition, which is received by the reception unit.

(10) The ultrasonic user interface device according to (7), in which
the control unit refers to the data for reference in which an ultrasonic image based on the reception result for comparison and the movement information of the limbs are associated with each other, which is obtained in advance, and obtains movement information of at least a part of the limbs from an ultrasonic image based on the reception result for recognition.

(11) The ultrasonic user interface device according to any one of (1) to (10), further including
an acoustic matching component including
- an ultrasonic vibration including at least one of the transmission unit or the reception unit,
- a deformable member that is disposed between the arm part or the leg part and has an acoustic impedance of 0.8 MRayls or more and 3 MRayls or less, and
- a container that houses the deformable member and has an acoustic impedance of 0.8 MRayls or more and 3 MRayls or less.

(12) An ultrasonic user interface device, including
an array-type ultrasonic vibrator configured in such a manner that a plurality of vibrator elements each including, for recognizing a movement of at least a part of limbs of a user, a transmission unit that transmits an ultrasonic wave toward an internal tissue of an arm part or a leg part of the user and a reception unit that receives an ultrasonic wave obtained when the ultrasonic wave is reflected on the internal tissue, is arranged in a circumferential direction of the arm part or the leg part.

(13) The ultrasonic user interface device according to (12), in which
the array-type ultrasonic vibrator performs sector scanning, convex scanning, or phased array scanning on the internal tissue.

(14) The ultrasonic user interface device according to (13), in which
a plurality of array-type ultrasonic vibrators each of which is the array-type ultrasonic vibrator is arranged so as to surround the arm part or the leg part in the circumferential direction of the arm part or the leg part.

(15) The ultrasonic user interface device according to (14), in which
the ultrasonic user interface device at least four array-type ultrasonic vibrators each of which is the array-type ultrasonic vibrator, the ultrasonic user interface device further including
a control unit that detects a position of the array-type ultrasonic vibrator by a triangulation method using a reception result received by a reception unit of each of the array-type ultrasonic vibrators.

(16) An ultrasonic user interface device, including:
an ultrasonic vibrator including at least one of a transmission unit that transmits an ultrasonic wave toward an arm part or a leg part and a reception unit that receives an ultrasonic wave obtained when the ultrasonic wave is reflected on an internal tissue of the arm part or the leg part; and
an acoustic matching component that is disposed between the ultrasonic vibrator and the arm part or the leg part and includes a deformable member having an acoustic impedance of 0.8 MRayls or more and 3 MRayls or less and a container that houses the deformable member and has an acoustic impedance of 0.8 MRayls or more and 3 MRayls or less.

REFERENCE SIGNS LIST

1 user
2 finger
3 forearm part (arm part, limb)
10, 10a to 10t ultrasonic vibrator
20, 120 ultrasonic user interface device
21 transmission unit
22 reception unit
23 control unit
41 elbow bone (bone, internal tissue)
42 radial bone (bone, internal tissue)
43 tendon (internal tissue)
44 muscle (internal tissue)
51 acoustic matching component
511 container
512 deformable member
75 ultrasonic wave
100, 100a to 100d, 100' 100a' to 100d' array-type ultrasonic vibrator (ultrasonic vibrator)

The invention claimed is:

1. An ultrasonic user interface device, comprising:
a transmission unit configured to transmit a first ultrasonic wave toward an internal tissue of one of an arm part or a leg part of a user;
a plurality of reception units configured to:
receive first movement information, wherein the first movement information is based on movement of at least one of the arm part and the leg part; and
receive one of the first ultrasonic wave based on the transmission of the first ultrasonic wave through the internal tissue or a second ultrasonic wave based on reflection of the first ultrasonic wave on the internal tissue, wherein the plurality of reception units surrounds one of the arm part or the leg part in a circumferential direction of one of the arm part or the leg part; and
an acoustic matching component configured to deform the ultrasonic user interface device to a shape of a skin surface of one of the arm part or the leg part.

2. The ultrasonic user interface device according to claim 1, wherein
the transmission unit includes a plurality of transmission units, and
the plurality of transmission units is in the circumferential direction of one of the arm part or the leg part.

3. The ultrasonic user interface device according to claim 2, wherein the plurality of reception units includes at least five reception units.

4. The ultrasonic user interface device according to claim 3, wherein
the plurality of reception units is further configured to receive at least one of a plurality of ultrasonic waves sequentially transmitted by each transmission unit of the plurality of transmission units,
the second ultrasonic wave, reflected on or
the first ultrasonic wave transmitted through the internal tissue.

5. The ultrasonic user interface device according to claim 4, further comprising:
a control unit configured to receive second movement information based on a plurality of reception results, wherein the plurality of reception units is configured to receive the plurality of reception results.

6. The ultrasonic user interface device according to claim 5, wherein
each of the plurality of reception units is configured to receive a first reception result of the plurality of reception results based on the transmission of the first ultrasonic wave, and
the control unit is further configured to receive third movement information based on the received first reception result of the plurality of reception results.

7. The ultrasonic user interface device according to claim 6, wherein
the plurality of reception units is further configured to:
receive information associated with the first reception result; and
receive fourth movement information based on the information associated with the first reception result, and
the control unit is further configured to determine the movement of at least one of the arm part and the leg part based on the received fourth movement information.

8. The ultrasonic user interface device according to claim 6, wherein
the control unit is further configured to correct positional deviation of the transmission unit and a reception unit of the plurality of reception units with respect to at least one of the arm part and the leg part based on a second reception result of the plurality of reception results,
the plurality of reception units is further configured to receive a third ultrasonic wave reflected on a bone of the user, and
the second reception result is associated with the third ultrasonic wave.

9. The ultrasonic user interface device according to claim 7, wherein
the plurality of reception units is further configured to:
receive waveform data of a third ultrasonic wave; and
receive fifth movement information based on the waveform data of the third ultrasonic wave, and
the control unit is further configured to determine the movement of at least one of the arm part and the leg part based on the waveform data.

10. The ultrasonic user interface device according to claim 7, wherein
the plurality of reception units is further configured to:
receive an ultrasonic image based on the first reception result; and
receive fifth movement information based on the ultrasonic image, and
the control unit is further configured to determine the movement of at least one of the arm part and the leg part based on the ultrasonic image.

11. The ultrasonic user interface device according to claim 1, wherein the acoustic matching component includes:

an ultrasonic vibrator including at least one of the transmission unit or the plurality of reception units,
a deformable member, between one of the arm part or the leg part and the ultrasonic vibrator, has a first acoustic impedance greater than or equal to 0.8 MRayls and less than or equal to 3 MRayls, and
a container, configured to house the deformable member, has a second acoustic impedance greater than or equal to 0.8 MRayls and less than or equal to 3 MRayls.

* * * * *